(12) United States Patent
Swager

(10) Patent No.: US 10,182,552 B2
(45) Date of Patent: Jan. 22, 2019

(54) COMBINATION SYSTEM FOR FEEDING AND WATERING LIVESTOCK

(71) Applicant: Dean Allen Swager, Buhl, ID (US)

(72) Inventor: Dean Allen Swager, Buhl, ID (US)

(*) Notice: Subject to any disclaimer, the term of this patent is extended or adjusted under 35 U.S.C. 154(b) by 439 days.

(21) Appl. No.: 14/330,857

(22) Filed: Jul. 14, 2014

(65) Prior Publication Data
US 2016/0007563 A1    Jan. 14, 2016

(51) Int. Cl.
*A01K 5/01*     (2006.01)
*A01K 7/00*     (2006.01)
*A01K 39/04*    (2006.01)

(52) U.S. Cl.
CPC ............... *A01K 5/01* (2013.01); *A01K 7/00* (2013.01); *A01K 39/04* (2013.01)

(58) Field of Classification Search
USPC ..... 119/51.5, 408, 409, 61.1, 81, 74, 58, 60, 119/59; D30/131, 132, 133
See application file for complete search history.

(56) References Cited

U.S. PATENT DOCUMENTS

| | | | |
|---|---|---|---|
| 260,009 A * | 6/1882 | Edmands | 119/408 |
| 272,451 A * | 2/1883 | Mather | 119/410 |
| 501,522 A * | 7/1893 | Marshal, Jr. | 119/58 |
| 1,294,366 A * | 2/1919 | Louden | A01K 5/01 |
| | | | 119/521 |
| 1,473,266 A * | 11/1923 | Webb | A01K 39/04 |
| | | | 119/51.5 |
| 1,512,987 A * | 10/1924 | Jorenby | A01K 5/01 |
| | | | 119/58 |
| 2,011,684 A * | 8/1935 | Martin | A01K 39/04 |
| | | | 119/51.5 |
| 2,019,370 A * | 10/1935 | Thomsen | A01K 39/04 |
| | | | 119/61.31 |
| 2,221,046 A * | 11/1940 | Gandrud | A01K 1/0005 |
| | | | 119/521 |
| 2,384,900 A * | 9/1945 | Duncan | 119/74 |
| 2,498,981 A * | 2/1950 | Belton | A01K 39/04 |
| | | | 119/51.5 |
| 2,626,724 A * | 1/1953 | Smallegan | 220/4.12 |
| 2,724,365 A * | 11/1955 | Snider | 119/74 |
| 3,169,510 A * | 2/1965 | Fulton, Jr. | 119/73 |
| 4,604,970 A * | 8/1986 | Blicher | 119/57.92 |
| 5,052,343 A | 10/1991 | Sushelnitski | |
| 5,967,092 A * | 10/1999 | Pederson | 119/528 |

(Continued)

FOREIGN PATENT DOCUMENTS

| | | | | |
|---|---|---|---|---|
| AU | 8939071 A | * | 3/1990 | A01K 7/00 |
| GB | 1429661 | * | 3/1976 | A01K 5/02 |

(Continued)

*Primary Examiner* — Andrea M Valenti
(74) *Attorney, Agent, or Firm* — Sean D. Burdick

(57) ABSTRACT

A combination system for feeding and watering livestock has an elongated water trough which is sloped to provide for the slow flow of drinking water positioned adjacent to an elongated feed bunk of comparable length. A series of vertically oriented lockable stanchions completes the structure. A water supply is provided along with discharge water collection and recycling and filtering devices are also provided to insure a continuous supply of suitable drinking water to livestock who are feeding from the feed bunk.

10 Claims, 3 Drawing Sheets

(56) References Cited

U.S. PATENT DOCUMENTS

| | | | | |
|---|---|---|---|---|
| 6,082,306 | A * | 7/2000 | Hatfield | A01K 1/0606 |
| | | | | 119/524 |
| 6,640,747 | B2 * | 11/2003 | Reusche | 119/69.5 |
| 6,973,895 | B2 | 12/2005 | Johnston | |
| 7,278,371 | B1 * | 10/2007 | Lato | A01K 5/0225 |
| | | | | 119/51.5 |
| 8,550,035 | B2 | 10/2013 | Moreno | |
| 2010/0180618 | A1 * | 7/2010 | Gavan | 62/291 |
| 2013/0256202 | A1 * | 10/2013 | Smith | 210/136 |
| 2013/0276716 | A1 * | 10/2013 | Nisbet et al. | 119/409 |

FOREIGN PATENT DOCUMENTS

| | | | | |
|---|---|---|---|---|
| WO | 80/02634 | 12/1980 | | |
| WO | WO 89/08388 | * | 9/1989 | A01K 5/02 |

* cited by examiner

COMBINATION SYSTEM FOR FEEDING AND WATERING LIVESTOCK

TECHNICAL FIELD

The presently disclosed and claimed inventive concept generally relates to a system for feeding and watering livestock, and more particularly to combination feed bunk and watering trough having a continuous flow of water.

BACKGROUND

Livestock such as dairy cows, and cattle in feed lots, are generally confined to pens or corrals as opposed to being allowed free range in pastures. It is there in the pens, where feed consumption and diet can be controlled, and where veterinary procedures can be performed. For purposes of this prior art background section, a typical dairy cow pen will be used as an example of the prior art. The pen is usually sized to accommodate 100 or more dairy cows. On one side of the enclosure there is a feed bunk, which is simply a concrete platform, usually placed at ground level, adjacent to a vertical curb which separates the concrete platform from the interior surface of the pen. Vertically oriented lockable stanchions are affixed to curb, and serve as a fence like barrier to allow the dairy cows to insert their heads through the stanchions to access the feed deposited on the feed bunk while at the same time preventing the cows from simply walking out of the pen and onto the feed bunk.

Lockable stanchions are generally preferred, as they can be left in an open position wherein each cow has free access to the feed bunk, or in a self locking configuration wherein once the cow inserts her head through the stanchion and lowers it to begin feeding, the stanchion latches in a locked position to hold the cows head in the stanchion, and a locked position to either lock the cows out or in depending upon what is needed. U.S. Pat. Nos. 5,878,697 and 6,082,306 to Hatfield are typical examples of the existing lockable stanchion designs, and the teachings of these patents are herein incorporated by reference.

Fencing completes the pen enclosure, which is normally configured to form a rectangular shaped pen. Water is provided by means of a water trough, which is usually nothing more than a suitably sized water tank, and normally located at the side of the pen opposite to the feed bunk. The reason that the water tank is located on the opposite side of the enclosure is because the area around the tank can become quite muddy.

In a typical dairy operation, especially those operations having a thousand or more cows, the cows are segregated by age and status into numerous pens. The nutritional requirements of the cows vary considerably depending upon age and status, for example, very young calves are monogastric and require liquid nutrition until the rumen starts to develop, and a young heifer has other nutritional needs that are different from those of a lactating cow. The use of the standard feed bunk, in conjunction with stanchions, facilitates the customization of the feed ration and the quantity of that ration to the type of livestock held in the various pens. The use of lockable stanchions assures equal access to that feed ration by all of the livestock held in the pen. In the case of lactating dairy cows the use of stanchions, in conjunction with the feed bunks, provides a means of ensuring that the cows each as much of the ration as possible, as it is well known that there is a correlation between the amount of milk produced and the poundage of feed consumed. As a general rule, a lactating Holstein cow should consume approximately 100 pounds of feed ration per day, with that feed ration comprised of approximately 50 to 55 pounds of dry feed matter, with the remainder in the form of moisture content. As a general rule, a Holstein cow will convert additional feed, above the additional 50 to 55 pounds of dry feed to milk at the ratio of 1 pound of feed to 2 pounds of milk.

The use of lockable stanchions also facilitates confinement of the livestock so as to enable veterinary care, pregnancy testing, and artificial insemination, amongst other needs. As a result, it is good practice to lock the livestock in the lockable stanchions for at least one hour, and sometimes up to several hours per day starting at the beginning of feeding when the feed ration is first deposited upon the feed bunk. This provides an opportunity for the dairyman to tend to the various needs of the livestock and ensure that the proper or desired feed ration is consumed by each animal.

The problem is that when the livestock are locked in the stanchions they do not have access to water. As a result, when the stanchions are unlocked there will be a mass movement of livestock from the feed bunk to the water tank, where they will crowd around it while attempting to drink.

Accordingly it is an object of this invention to provide a combination livestock feeding and watering system that makes available to all animals held in a pen equal access to both feed ration and a continuous supply running water while feeding irrespective of whether the animal is confined in a stanchion or simply allowed free access to feed. It is also an object of this invention to provide a livestock feeding and watering system that optimizes feeding and drinking conditions such that it maximizes the amount of feed the livestock will consume.

SUMMARY OF THE DISCLOSURE

The basic structure of the dual trough system includes a curb, which serves as a boundary barrier separating a water trough and a feed bunk from the containment area of a livestock pen, and serves to keep manure and other fecal matter out of the feed bunk and water trough. In the preferred embodiment the curb and feed bunk are all formed from poured concrete. The water trough, which can be formed of any suitable material, and most commonly formed of metal, has a water canal having a canal base which is sloped to facilitate and keep fresh water flowing from one end of the combination feeding system to the other in a steady stream. The capacity or size of the water canal, and the slope of the canal base need to be empirically determined depending upon the contemplated length of the dual trough system and the slope of the terrain where the livestock pen is sited. In some cases, where the slope of the terrain where the livestock pen is located is steep, it may be necessary to install intermittently spaced dams in the water canal to capture and hold water as its flowing down the water canal so as to slow down the water flow which would otherwise race down the canal.

The feed bunk is of conventional design, and, in the preferred embodiment, is simply a concrete pad sited at, or very close to, ground level. The typical feed bunk 16 is about 8 to 12 feet wide, but in no event less than the width necessary to permit the feed delivery machinery travel along and upon the feed bunk, and normally sited alongside an access lane accessible by feed trucks or tractors pulling feed trailers which are used to deposit feed on the bunk as the truck or tractor travels down the access lane.

A barrier fence is needed above feed trough system 10 to prevent livestock stepping over or through the water trough and onto the feed bunk, and beyond. There are numerous designs for such barrier fences, including horizontal fencing, made of metal, wood or wire, which is spaced so as to enable livestock to stick their heads and necks through the fencing to access water and feed, yet prevent the livestock from leaving the pen. These are commonly used in feed lots where it is not anticipated that the livestock will require much in the way of veterinary care. For dairy cows, one preferred barrier fence is an assembly of lockable gate stanchions.

With lockable gate stanchions, the typical prior art stanchions can be selectively configured to lock the livestock out of the stanchions by locking the gate in a closed position to prevent livestock from inserting their heads and necks through the gate, or in an open position to allow livestock free access to water and feed, or in a trip to lock position where the gate remains open until an animal puts its head and neck through the gate and then lowers its head, pushing against the lower portion of the gate to trip it shut and locked. These are well known in the art and play no part in the present invention other than some sort of barrier fence is needed to keep the livestock from walking over the dual trough system and exiting the pen.

A water recycling feature is also provided. This is comprised of an inlet water line having an isolation valve connected to a water supply tank. The water supply tank is itself connected to a fresh water supply line which includes a control valve assembly having some sort of water level sensor, to maintain a more or less constant supply of water in the tank, and replenishes the water supply as necessary as flowing water in the water trough is consumed or evaporates. At the discharge end of the water trough there is provided an outflow water line which receives flowing water at the lower end of the water trough and transfers it to a sump where the discharged water from the water trough is collected for recycling. A water recycling pump is provided for pumping the discharged water through a recycling line back to a filter and back into the water supply tank. The filter, can be of any suitable configuration, which could be a flat screen, or a rotating drum screen filter which screens out feed and debris and deposits it alongside the water supply tank where is can be recovered and disposed of by the dairy man.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DEFINITIONS

Figure 1:
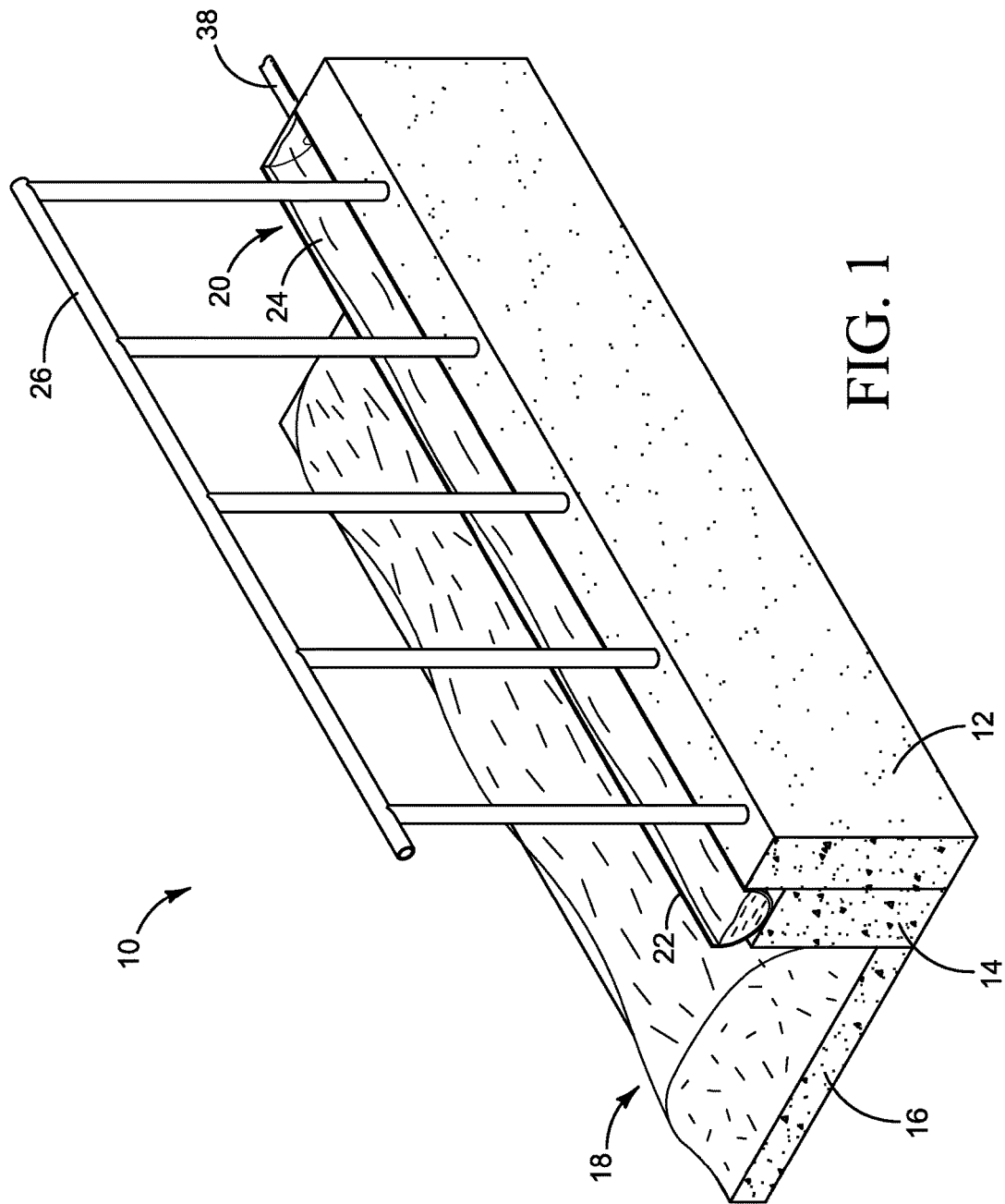
FIG. 1 is a perspective representational view of a section of the dual trough assembly and stanchion assembly.

In the following description and in the figures, like elements are identified with like reference numerals.

The use of "e.g.," "etc," and "or" indicates non-exclusive alternatives without limitation unless otherwise noted.

The use of "including" means "including, but not limited to," unless otherwise noted.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 2:
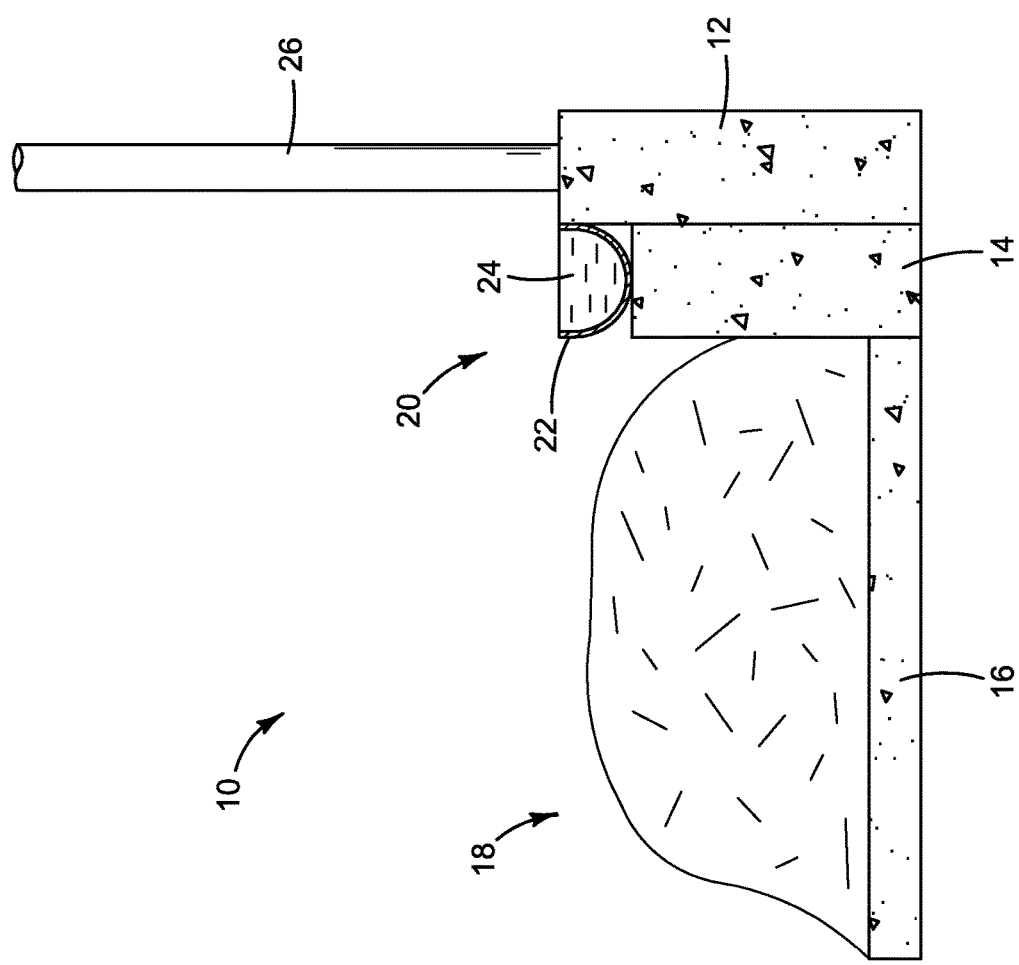
FIG. 2 is a representational side view of the dual trough feeding system.

FIGS. 1 and 2 illustrate the basic structure of the dual trough system 10 which includes curb 12, which serves as a boundary barrier separating water trough 14 and feed bunk 16 from the containment area of the livestock pen, and serves to keep manure and other fecal matter out of the feed bunk and water trough. In the preferred embodiment curb 12, water trough base 14 and feed bunk 16 are all formed from poured concrete. Water trough base 14 has a water canal 20 formed of a suitable material such as sheet metal, extruded plastic or the like 22 which is sloped to facilitate and keep fresh water 24 flowing from one end of the dual trough system 10 to the other in a steady stream. The capacity or size of the water canal 20, and the slope of the canal 20 need to be empirically determined depending upon the contemplated length of the dual trough system and the slope of the terrain where the livestock pen is sited. In some cases, where the slope of the terrain where the livestock pen is located is steep, it may be necessary to install intermittently spaced dams in the water canal to capture and hold water as its flowing down the water canal 20 so as to slow down the water flow which would otherwise race down the canal.

Feed bunk 16 is of conventional design, and, in the preferred embodiment, is simply a concrete pad sited at, or very close to, ground level. The typical feed bunk 16 is about 8 to 12 feet wide, and normally sited alongside an access lane accessible by feed trucks or tractors pulling feed trailers which are used to deposit feed on the bunk as the truck or tractor travels down the access lane. The reason feed bunk 16 is sited at or close to ground level is to facilitate the use of a conventional front end loader, or other suitable mobile equipment which is driven down the length of the bunk to remove excess feed, or spoiled feed.

A barrier fence is needed above feed trough system 10 to prevent livestock stepping over or through water trough 20 and onto feed bunk 16, and beyond. There are numerous designs for such barrier fences, including horizontal fencing, made of metal, wood or wire, which is spaced so as to enable livestock to stick their heads and necks through the fencing to access water and feed, yet prevent the livestock from leaving the pen. These are commonly used in feed lots where it is not anticipated that the livestock will require much in the way of veterinary care. For dairy cows, one preferred barrier fence is an assembly of lockable gate stanchions. Good examples of lockable gate stanchions are disclosed in U.S. Pat. Nos. 5,878,697 and 6,082,306, the teachings of which are hereby incorporated by reference. Lockable gate stanchions are shown representationally in FIGS. 1 and 3 as a plurality of vertical posts 26 arrayed in a line along and anchored into curb 12.

With lockable gate stanchions, the typical prior art stanchions can be selectively configured to lock the livestock out of the stanchions by locking the gate in a closed position to prevent livestock from inserting their heads and necks through the gate, or in an open position to allow livestock free access to water and feed, or in a trip to lock position where the gate remains open until an animal puts its head and neck through the gate and then lowers its head, pushing against the lower portion of the gate to trip it shut and locked. These are well known in the art and play no part in the present invention other than some sort of barrier fence is needed to keep the livestock from walking over the dual trough system and exiting the pen.

Dairy cows also need substantial individual attention for such tasks are pregnancy testing, insemination, and veterinary care, and the use of assemblies of lockable stanchions provides a means of holding the cows stationary, and spaced apart, so that the dairyman can attend to these various needs. As a result, dairy cows are often trained from birth to use the stanchions at certain times of the day, usually at the time when feed is first deposited upon the feed bunk. Many dairy operations keep the cows locked in the stanchions for at least an hour, and up to four hours per day. With the conventional feed bunk arrangement, this means that the locked in cows have no access to water at the time they are actively feeding.

Figure 3:
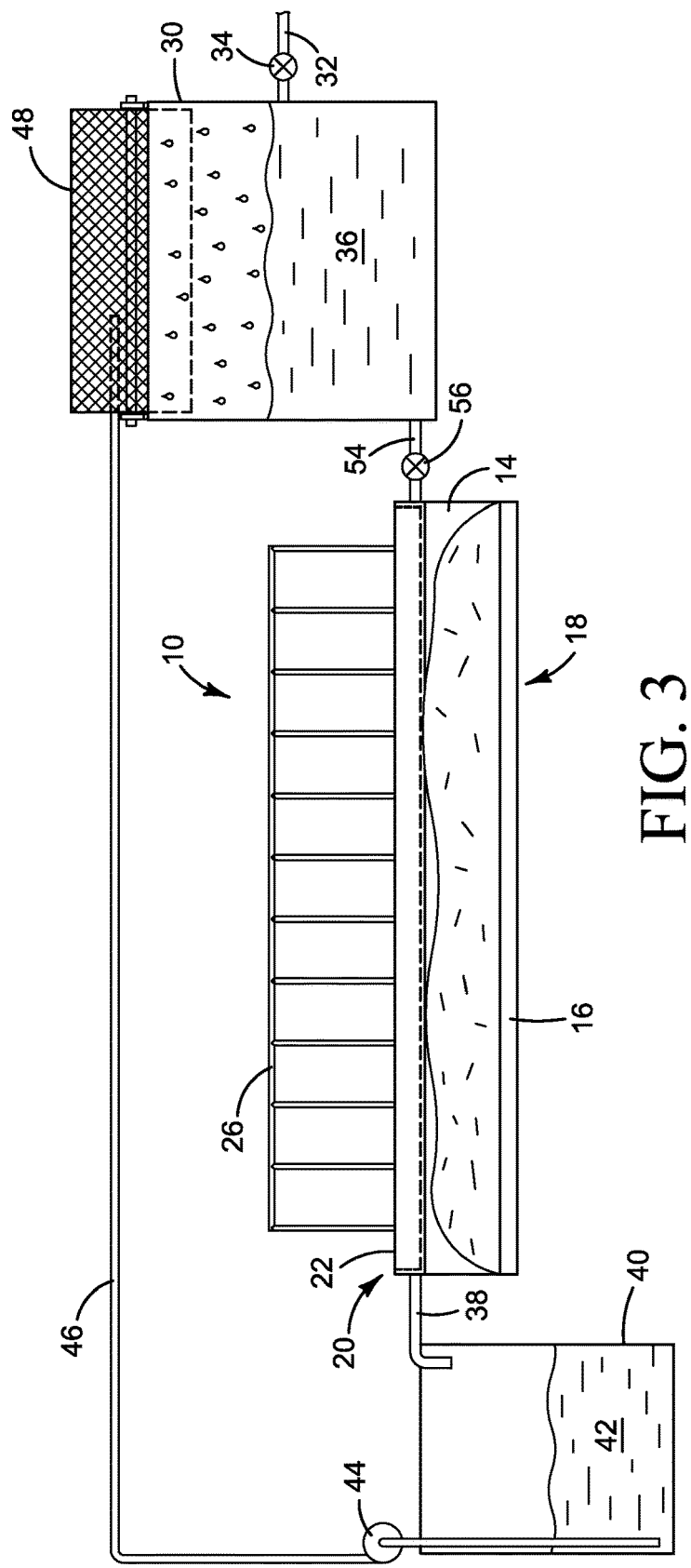
FIG. 3 is a perspective representational view of a dual trough feeding system with recycling water.

FIG. 3 discloses a dual trough feeding system with a water recycling feature. This is comprised of inlet water line 54, having an isolation valve 56, connected to a water supply tank 30. Water supply tank 30 is itself connected feed water supply line 32 which includes a control valve assembly 34 having some sort of water level sensor, to maintain a more or less constant supply of water 36 in the tank, and replenishes the water supply as necessary as flowing water in water trough 20 is consumed or evaporates. At the discharge end of water trough 20 there is provided a outflow water line 38 which receives flowing water 24 at the lower end of water trough 20 and transfers it to sump 40 where the discharged water 42 from water trough 20 is collected for recycling. A water recycling pump 44 is provided for pumping discharged water 42 through recycling line 46 back to a filter 48 and back into water supply tank 30. In one preferred embodiment, filter 48 is a rotating drum screen filter which screens out feed and debris and deposits it alongside water supply tank 30 where is can be recovered and disposed of, or recycled by, the dairy man.

While the above described water recycling system if the preferred design, there are other arrangements or designs that can be utilized to deliver a constant stream of flowing water to water trough 20, including designs as simple as a hose delivering a constant stream of water 24 to water trough 20, and piping the discharged water 42 into a settling pond, or even into an irrigation ditch or flowing stream.

The use of this dual trough feeding system 10 results in increased milk production for dairy cows as demonstrated in experimental testing. In a currently ongoing experimental test, which began on Oct. 23, 2013, 600 Holstein dairy cows, all from the same breeding stock, and who were all within few months of the same age, and who had just given birth to their first calves were divided into six groups of 100 cows each; each group was confined in a separate pen of equal size. The expected milk production from this Holstein breed, during the beginning of the first lactation cycle was expected to average between 72 to 75 pounds of milk per day.

Three of the pens were configured with conventional feed bunks, and configured with lockable stanchions, and each provided with a separate water tank located across the pen and opposite to the feed bunks. The cows in each pen were locked in the stanchions for one to three continuous hours on a daily basis beginning at the time the cows were initially being fed. Sufficient feed was placed on the feed bunks so that at the end of feeding, there remained 3% to 5% of the feed remained uneaten. The exact amount of feed, measured in pounds, delivered each day to each pen was recorded. These were the control groups of cows.

The remaining three groups of 100 cows each were confined in three additional pens which were configured with the above described combination feeding systems 10. The combination feeding systems were each configured with a water recycling system of the type disclosed in FIG. 3. Like the two control groups, these cows were locked in the stanchions for one to three continuous hours on a daily basis, and fed with sufficient feed such that at the end of the feeding cycle there remained 3% to 5% uneaten feed. Again, the exact amount of feed, measured in pounds, delivered to each pen was recorded.

For the three groups fed in the pens having the dual trough feeding system the amount of feed ration delivered and consumed by the 100 cows contained in each pen averaged an additional four to six pounds per day per cow since the beginning of the test period, which, given the benchmark feed to milk conversion ratio of one pound of extra feed ration converts to two additional pounds of milk production, represents an increase in milk production of approximately 8 to 12 pounds of increased milk production per day per cow, or put another way, an increase in milk production in excess of 10%.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A combination system for feeding and watering livestock confined in a livestock pen, comprising:
    an elongated water trough having first and second elongated sides and first and second ends and sloped to keep water flowing in a steady stream from the first end to the second end of said trough, said elongated water trough comprising a water canal atop a water trough base, said water trough base configured to place the water canal above ground level;
    an elongated feed bunk of comparable length to the elongated water trough having first and second ends and elongated first and second sides, said elongated first side positioned directly adjacent to said second elongated side of said water trough, said elongated feed bunk sited close to ground level;
    a plurality of vertically oriented lockable livestock stanchions positioned adjacent to the first elongated side of said elongated water trough, said stanchions anchored into a curb that provides a barrier separating the elongated water trough and the elongated feed bunk from the livestock pen, said stanchions configured to allow the livestock in the livestock pen to have simultaneous equal access to feed placed on the feed bunk and to water flowing in the water trough;

a water supply tank operatively connected to said first end of said elongated water trough for delivering water to said first end of the water trough at a quantity sufficient for water to flow from said first end of the elongated water trough to said second end;

a feed water supply line connected to the water supply tank through a control valve assembly configured to cooperate with a water level sensor to maintain a constant supply of water in the water supply tank;

a sump operatively connected to said second end of the elongated water trough for receiving water that has flown through said elongated water trough from said first end to said second end; and a water recycling pump configured to pump water received in the sump to the water supply tank via a recycling line.

2. The combination system of claim 1 further comprising a filter configured to screen out feed and debris from the recycling line.

3. The combination system of claim 1 wherein the livestock pen is located on terrain having a slope.

4. The combination system of claim 3 wherein the elongated water trough is sloped according to the slope of the terrain.

5. The combination system of claim 3 further comprising intermittently spaced dams installed in the elongated water trough.

6. A dual trough system for feeding and watering livestock confined in a livestock pen comprising:

an elongated water trough having first and second elongated sides and first and second ends and sloped to keep water flowing in a steady stream from the first end to the second end of said elongated water trough, said elongated water trough comprising a water canal atop a water trough base, said water trough base configured to place the water canal above ground level;

an elongated feed trough of comparable length to the elongated water trough having first and second ends and elongated first and second sides, said first elongated side positioned directly adjacent to said first elongated side of said water trough, said elongated feed bunk sited close to ground level;

a barrier fence, configured to allow livestock simultaneous equal access to said water trough and said feed trough while not allowing passage of livestock through said barrier fence, positioned adjacent to the first elongated side of said elongated water trough;

a water supply tank operatively connected to said first end of said elongated water trough for delivering water to said first end of the water trough at a quantity sufficient for water to flow from said first end of the elongated water trough to said second end;

a sump operatively connected to said second end of the elongated water trough for receiving water that has flown through said elongated water trough from said first end to said second end; and a water recycling pump configured to pump water received in the sump to the water supply tank via a recycling line.

7. The dual trough system of claim 6 comprising a filter configured to screen out feed and debris from the recycling line.

8. The dual trough system of claim 6 wherein the barrier fence further comprises stanchions arrayed in a line along and anchored into a curb.

9. The dual trough system of claim 8 wherein the livestock pen is located on terrain having a slope and wherein the elongated water trough is sloped according to the slope of the terrain.

10. The dual trough system of claim 8 further comprising intermittently spaced dams installed in the elongated water trough.

* * * * *